U. BAHAM.
NUT LOCK.
APPLICATION FILED MAY 15, 1915.
1,264,751.  Patented Apr. 30, 1918.
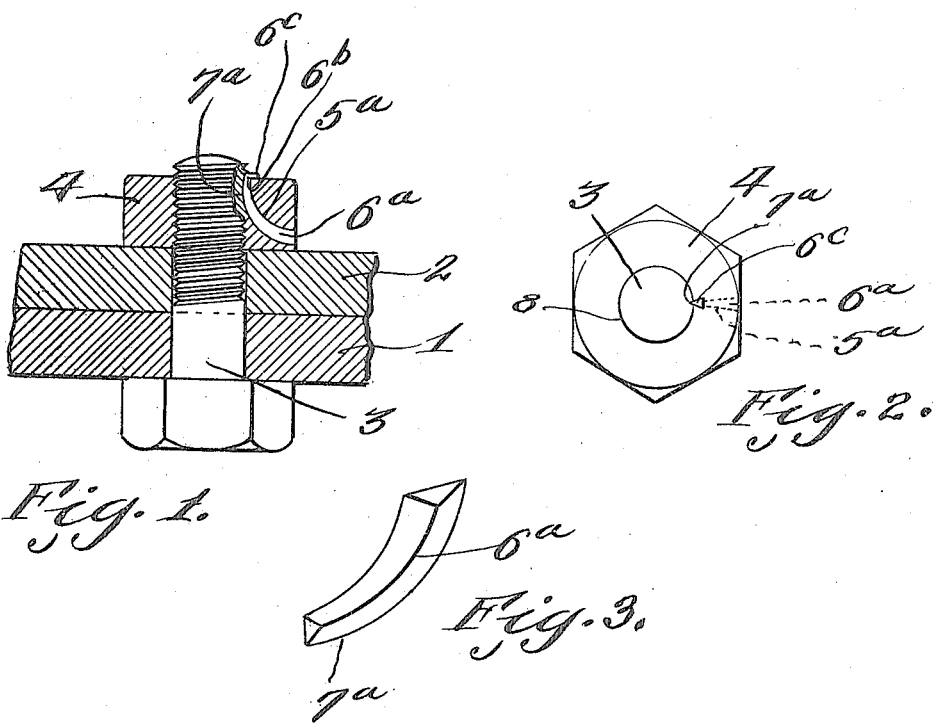
Witnesses
Philip Jewell
Frances G. Davell
Inventor
U. Baham
By D. Swift & Co.
his Attorneys

UNITED STATES PATENT OFFICE.

ULYSSES BAHAM, OF MADISONVILLE, LOUISIANA.

NUT-LOCK.

1,264,751.            Specification of Letters Patent.      Patented Apr. 30, 1918.

Application filed May 15, 1915. Serial No. 28,387.

*To all whom it may concern:*

Be it known that I, ULYSSES BAHAM, a citizen of the United States, residing at Madisonville, in the parish of St. Tammany and State of Louisiana, have invented a new and useful Nut-Lock; and I do hereby declare the following to be a full, clear, and exact description of the invention, such as will enable others skilled in the art to which it appertains to make and use the same.

This invention relates to an improved nut lock, and an object of the same is to provide a device of this nature which is simple and efficient and practical in construction.

One of the features of the invention is to provide a key triangular in cross section to fit a correspondingly shaped recess in the nut, so that one of the corner edges would bite into the thread of the bolt and prevent the nut from unscrewing.

Another feature of the invention is the provision of a key segmental or curved in contour and triangular in cross section, and tapering, and designed to fit a correspondingly constructed recess in the nut and designed to bite against the thread of the bolt, subsequently to which the tapered end of the key is upset to prevent its displacement.

In practical fields the details of construction may necessitate alterations, falling within the scope of what is claimed.

The invention comprises further features and combination of parts, as hereinafter set forth, shown in the drawings and claimed.

Figure 1 is a sectional view through the two members showing a bolt extending transversely thereof with a nut thereon, and a segmental or curved tapering key in a recess of the nut, said key being triangular in cross section and biting into the threads of the bolt.

Fig. 2 is a view in elevation of the nut with the key in place.

Fig. 3 is a detail perspective view of the key.

Referring to the drawings, 1 and 2 designate two members to be clamped by the bolt 3 and nut 4. The nut is provided with an opening $5^a$ triangular in cross section.

A key $6^a$ is provided, and this key is not only triangular in cross section, but is segmental or curved in contour, as well as tapering, and fits the correspondingly constructed recess $5^a$, which extends from one of the polygonal faces of the nut, through the wall of the nut and terminates with an open end adjacent the bore of the nut, so that its corner edge $7^a$ will extend slightly inwardly of the nut beyond the thread of the bore, so as to bite into the threads of the shank of the bolt, thereby preventing the nut from unscrewing. Subsequently to inserting this form of key, the tapered end portion $6^b$ of the key is upset as at $6^c$, to prevent displacement of the key, which would otherwise occur from jarring.

The invention having been set forth, what is claimed as new and useful is:—

In combination with a bolt and a nut threaded thereon, a tapered locking key curved substantially ninety degrees and being triangular in cross section, said nut having an opening in its wall from one of the polygonal faces of the nut and terminating adjacent the threaded bore of the nut and curved on a radius having its center substantially at one corner of the nut and shaped correspondingly to the key, and into which opening said key is adapted to be driven, whereby one corner edge of the triangular key may cut transversely the threads of the bolt, thereby preventing unscrewing of the nut, the tapered end of the key being upset forming a lug engaging one face of the nut and adapted to coöperate with the larger end of the key to prevent removal of the key.

In testimony whereof I have signed my name to this specification in the presence of two subscribing witnesses.

ULYSSES BAHAM.

Witnesses:
     LEON CAGNOLATTI,
     JAS. SCARZA.

Copies of this patent may be obtained for five cents each, by addressing the "Commissioner of Patents, Washington, D. C."